US006445959B1

(12) United States Patent
Poth

(10) Patent No.: US 6,445,959 B1
(45) Date of Patent: *Sep. 3, 2002

(54) SYSTEM FOR MONITORING CNC MACHINE CONTROLLERS

(75) Inventor: Philip J. Poth, Seattle, WA (US)

(73) Assignee: Thermwood Corporation, Dale, IN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 81 days.

(21) Appl. No.: 08/624,874

(22) Filed: Mar. 27, 1996

(51) Int. Cl.$^7$ ................................................ G05B 13/02
(52) U.S. Cl. ................... 700/28; 700/71; 700/3; 700/96; 700/180; 409/79; 409/80; 493/2; 187/247
(58) Field of Search ................. 700/28, 71, 3, 700/96, 180; 409/79, 80; 493/2; 187/247

(56) References Cited

U.S. PATENT DOCUMENTS 4,281,379 A * 7/1981 Austin ........................ 364/132
4,841,432 A * 6/1989 Kishi et al. .................. 364/191
5,590,046 A * 12/1996 Anderson et al. ...... 364/474.13

OTHER PUBLICATIONS

Song et al., Design of the Distributed Architeccture of a Machine–tool, 1996, IEE, pp. 250–260.*

* cited by examiner

Primary Examiner—William A. Cuchlinski, Jr.
Assistant Examiner—McDieunel Marc
(74) Attorney, Agent, or Firm—Lalos & Keegan

(57) ABSTRACT

A number of computer-numerical-control (CNC) machine controllers are associated in the same plant or facility or in related facilities. Each CNC machine controller gathers and stores status information related to the state of operations being performed. A remotely located central computer separately addresses each of the controllers to transfer the status information to a central location where the entire plant or facility operation can be evaluated.

13 Claims, 3 Drawing Sheets

SYSTEM FOR MONITORING CNC MACHINE CONTROLLERS

BACKGROUND OF THE INVENTION

The present invention is related to numerical control (NC) and more particularly to computer numerical control (CNC). Numerical Control is the generic term applied to the automation of general-purpose machine tools. Such automation is achieved through electronics and, utilizing computers, such automation has become more flexible and efficient.

One advantage of numerical control is the ability to accurately position the axes of a machine and control the cutting feeds and speeds for a machining pattern that can be repeated for each workpiece. This positioning and control information (the NC data) makes up an NC program or part program which is created by a tooling engineer (programmer). NC programs are stored in a memory of the CNC control system (hereinafter referred to generally as the controller) after the programs have been loaded into the memory through a punched tape, for example. In more sophisticated controllers, portions of the NC program can be created and loaded directly into the controller memory by "teaching" the machine with a hand held programmer. Once the NC program is written and stored in the controller, manual action is normally limited to setting up the part, starting the CNC controller which executes the program, and carrying out any necessary manual operations such as tool changes. The NC program, when executed by the controller directs the machine through a series of fabrication steps. For example, where the machine includes a cutting tool the cutting tool is directed relative to the workpiece to make a series of cuts (straight line or circular) in accordance with a series of NC program instructions. These instructions direct the tool as to where the workpiece is to be cut and in what order the cuts are to be made.

Most NC and CNC systems are programmed according to a standard of the Electronic Industries Association designated as EIA RS 274-D. The part program information is typically downloaded into the controller from a punched tape reader through an Input/Output (I/O) channel of the controller. However, in more sophisticated controllers, a part program file can be transferred into the controller from a remote, off-line computer through a data link (e.g. telephone line and modem), or a wired or wireless local area network (LAN) or wide area network (WAN). Further the part program information can be downloaded from a floppy disk through a drive in the controller. However, in all instances of part program file transfer, the controller must be in a non-execute state and dedicated solely to the task of downloading the file. A great deal of production time is thereby lost during these downloading or uploading procedures. Uploading is the transfer of data from the controller to an external device, e.g. remote computer, tape, floppy disk, etc.

This disadvantage may be overcome by utilizing the multitasking capabilities of a commercially available CNC control system. Such system is the 91000 SuperControl, available from Thermwood Corporation, Dale, Ind. The 91000 SuperControl is a 486 based multi-processor system that operates under an OS-2 operating system, with full multi-tasking capability. With such multi-tasking capability, production down time is reduced by downloading part program files into the controller as one independent task while concurrently running a production program on a part or workpiece as a separate independent task.

SUMMARY OF THE INVENTION

In large operations, a number of CNC machine controllers may be located within a facility or in a number of related facilities. In order to monitor operations for an entire plant or operation, it would be beneficial to have the capability of communicating with each of these controllers to gather and monitor status information at a single, remotely located computer. The present invention takes advantage of the multi-processor, multi-tasking capability of the Thermwood 9100A SuperControl to provide this capability.

As each CNC machine controller, with a multi-tasking capability (e.g. Thermwood 91000 SuperControl) is running a production program on a part or workpiece, it gathers and stores status information in a status file. Then, on a periodic basis or whenever a plant manager elects, a central computer requests the contents of the status file from a selected controller. Such status files can then be analyzed, combined, compiled, printed, etc. at the off-line remote computer while the CNC machine controllers continue to run their production programs.

DETAILED DESCRIPTION

The present invention can be implemented in a multi-processor controller with a multi-tasking capability. One such commercially available controller is the 91000 SuperControl manufactured and sold by Thermwood Corporation, Dale, Ind. Although a detailed understanding of such a controller is not necessary for the present invention, a general description is helpful.

Figure 1:
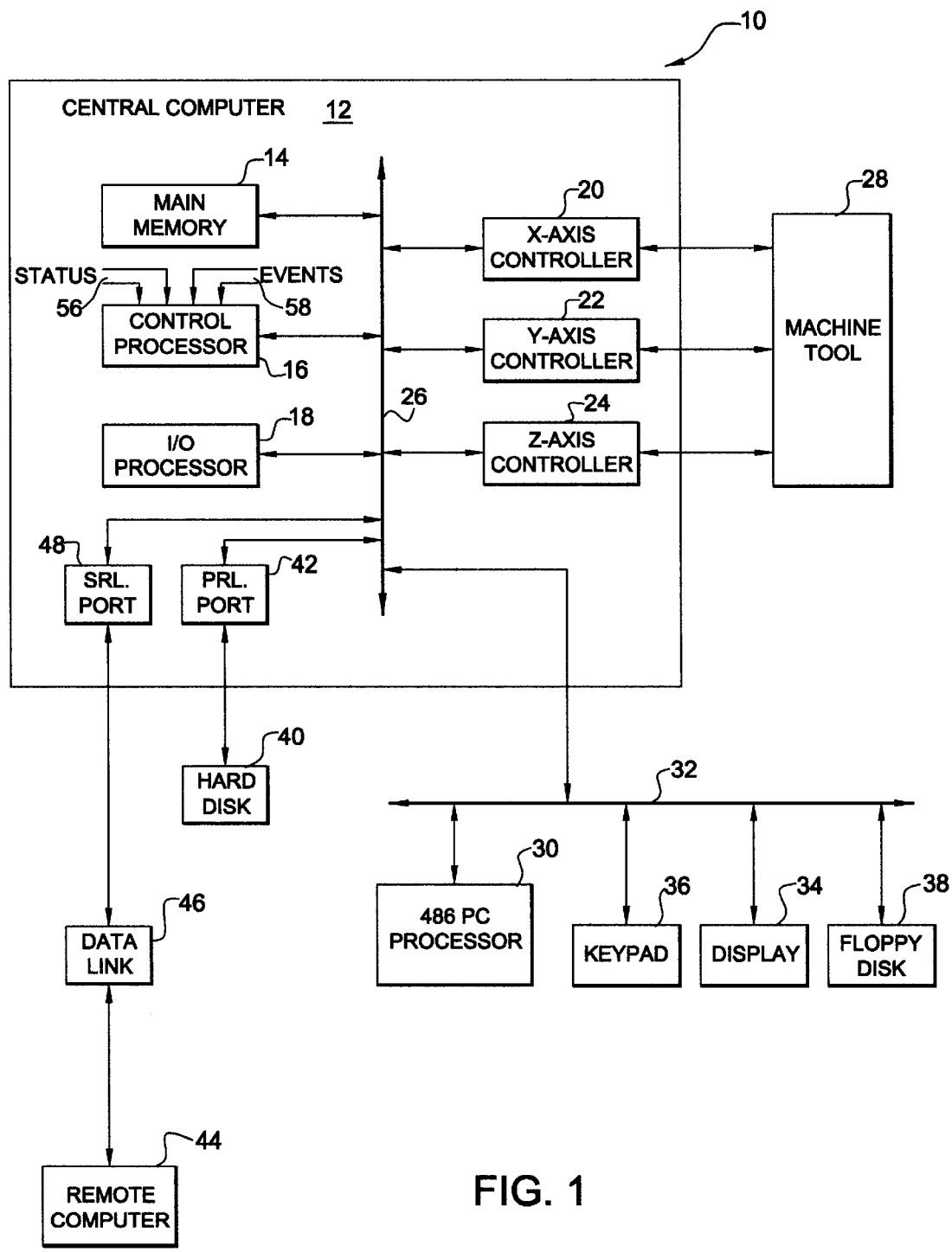
FIG. 1 is a general block diagram of a CNC machine controller for use with the present invention.

As shown in the FIG. 1, the controller 10 generally includes a computer 12 with a main memory 14, in which both the operating system program and part programs may be stored. The controller is a multi-processor system that includes control processor 16, and Input/Output (I/O) processor 18, and may include at least an x-axis controller 20, y-axis controller 22 and z-axis controller 24. The control processor 16 performs the mathematical calculations and executes all control functions necessary to run the operating system software and NC programs. The I/O processor 18 operates to process input and output tasks and to permit communication between external devices and the controller internal data bus 26. Axis controllers 20, 22 and 24 operate each axis of machine tool 28 by receiving axis movement instructions from control processor 16, processing those instructions and providing control signals for each axis. Axis controllers 20, 22 and 24 also control and process compensation data for each axis.

In the Thermwood SuperControl, the "front end" of the controller 10 is a 486 based personal computer (PC) with a 486 PC processor 30 and PC Data Bus 32. The PC processor 30 provides the control and communication functions for the PC compatible peripheral devices such as display 34, keypad 36 and floppy disk or hard diskette 38, and communication between the PC bus 32 and controller internal data bus 26. The Thermwood SuperControl operates under the OS-2 operating system with full multi-tasking capabilities. The OS-2 operating system is widely known and well understood in the art and a detailed discussion is not required for an understanding and appreciation of the present invention. Under the OS-2 multi-tasking operating system, front-end functions can be performed by PC processor 30 independently of and concurrently with production and machinery functions performed under the supervision of control processor 16.

The present invention takes advantage of the multi-tasking capability of the CNC machine controller 10 to download CNC part program files into main memory 14 while control processor 16 is executing another part program on machine tool 28. Concurrent execution of these two tasks saves production time and enhances the capability of the controller. Under control of the OS-2 operating system the I/O processor 18 provides the data communication functions necessary to download a part program file into the controller from an external source. An example external source is a physically local hard disk drive 40 that communicates data to the internal data bus 26 through parallel I/O port 42. Another example is a physically remote computer 44 that communicates through a data link 46 (e.g. telephone lines and modem, RF transmitter and receiver, etc.) and serial I/O port 48. In the present invention, the data transfer and communication processing takes place at the same time as production processing is being performed by the control processor and machine tool.

In addition to downloading CNC part program files into main memory 14 from a hard disk drive 40 or remote computer 44, and uploading CNC part program files to a remote computer 44, the present invention takes advantage of the multi-tasking capability of CNC machine controller 10 to monitor certain events and to store certain status information in response to such events. This status information is written to a status file in the hard disk 40, for example. Ideally, a complete history of all CNC machine operations would be stored in a status file. However, since the hard disk 40 has a limited storage capacity, the size of the status file must also be limited. Therefore, a limit must be put on the time span covered by the status file in order to limit its size. In order to guarantee that the status file will include the most recent data covering a predetermined time span, the status file is created and updated as an older file appended to a newer file. After the predetermined time span has expired, the old file is deleted or cleared, and is replaced by the data in the new file, i.e. by writing the new file data into the old file. The new file is then cleared and new status information is written into the new file as selected triggering events are detected by the controller 10.

The triggering events that cause status information to be read into the status file are determined for each unique application in which the present invention is used. Such events may include starting of the machine operation or part program or stopping the machine operation upon completion, stopping the operation or program during performance (e.g. because of an error) and restarting the operation or program, and detection of certain errors or faults. The status information that will be read into the status file will again depend on the particular application. These may include axis status, axis position, gantry skew, spindle rpm, etc. Through the keypad 36, the operator may enter certain heading information into the status file, such as current date and time, operator name, part name, tool number, etc. Further, the operator can specify the time span or period over which current status information will be retrieved and stored.

Figure 2:
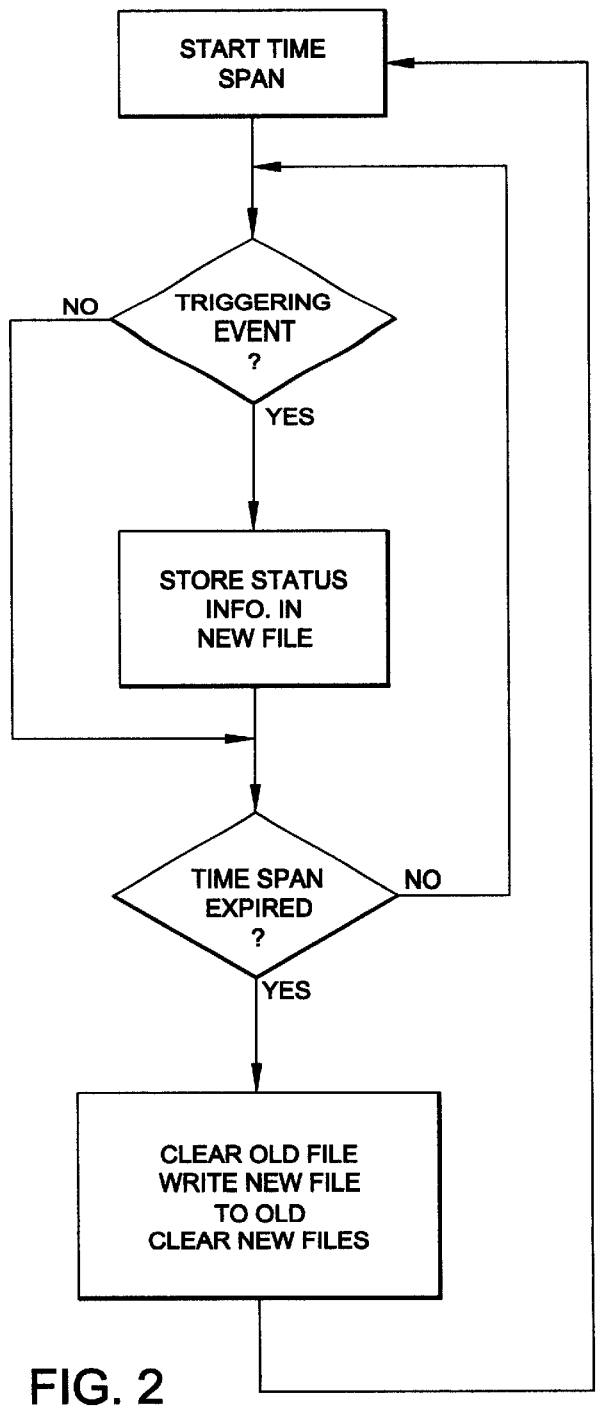
FIG. 2 is a general program flow diagram of the status file feature of the present invention.
Figure 3:
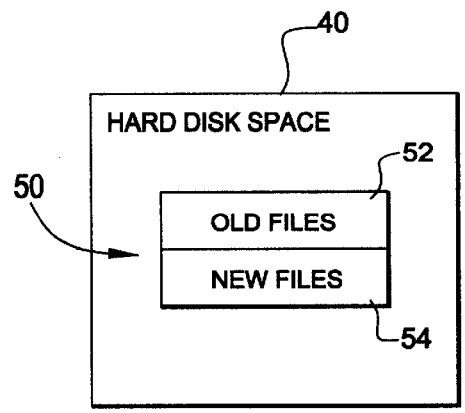
FIG. 3 illustrates an example status file structure in a hard disk.

Programming methods for file access and storage and data access and storage within files are well known in the art, and will depend on the particular application of the present invention. FIG. 2 is a general flow diagram of the status file feature of the present invention. FIG. 3 shows generally the structure of status file 50 stored in hard disk 40 as old status file 52 appended to new status file 54. The control processor 16 (FIG. 1), under direction of system software stored in memory 14 will gather status information and monitor events over bus 26 or via dedicated status lines 56 and/or event lines 58 connected to various parts of CNC machine controller 10 and/or machine tool 28. The gathered status data is written to the status file 50 in hard disk 40 via bus 26 and parallel port 42.

Figure 4:
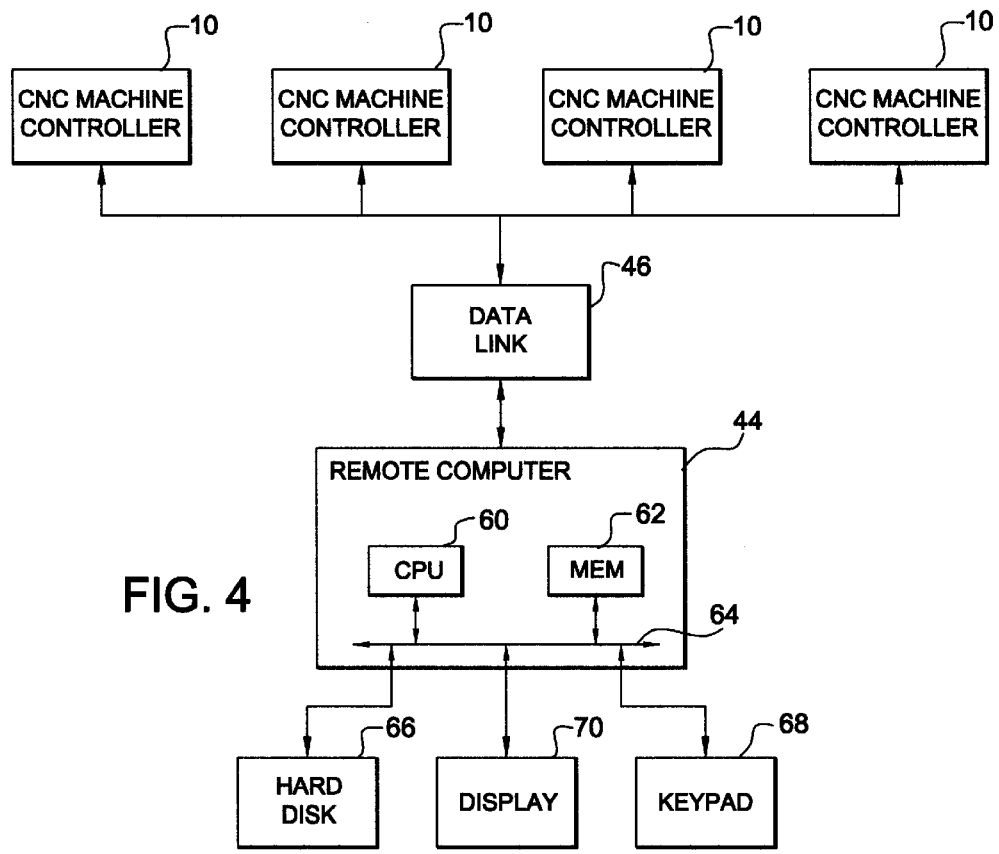
FIG. 4 is a general block diagram of a system with a number of CNC machine controllers in communication with a central remote computer.
Figure 5:
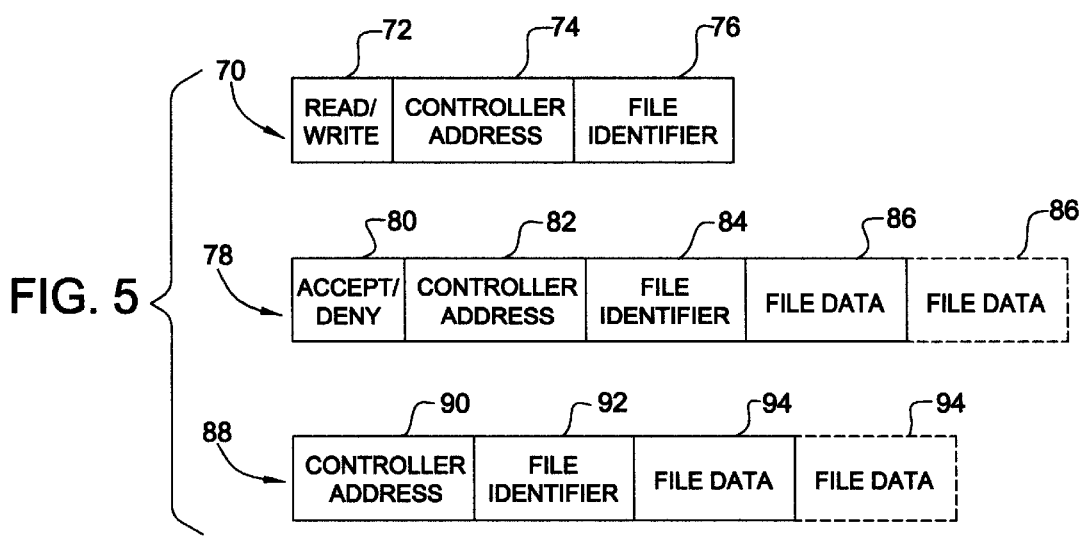
FIG. 5 shows exemplary data structures for file transfers between the CNC machine controllers and the remote computer.

As shown in the system diagram of FIG. 4, a machine tool plant or facility may employ a number of CNC machine controllers 10. Each of these controllers 10 is connected to data link 46, which is in turn connected to remote computer 44. The remote computer 44 may be, for example, a 486 based personal computer (PC) with a central processing unit (CPU) 60, memory 62, data bus 64, and standard input/output (I/O) devices such as hard disk 66, keypad 68 and display 70. In order to gather information from any or all of CNC machine controllers 10 and to evaluate the entire plant operation, remote computer 44 initiates data transfer requests from specified controllers 10. The data transfer request will include an address that identifies a particular controller. The transfer request will also identify the request as a read request (i.e. to retrieve a file from the controller) or a write request (i.e. to send a file to the controller). Further, the request may include a file identifier. FIG. 5 shows an example format of a data request 70. Request 70 may include a read/write bit 72, controller address field 74 and file identifier field 76. The file requested for transfer may be a part program file that the remote computer is downloading to a controller, for example, or a status file 50 (FIG. 3) that is to be uploaded to the remote computer.

As discussed above, remote computer 44 includes a processor 60 that is programmed using conventional techniques to make data transfer requests on a periodic basis, for example, or as initiated by an operator through keypad 68, for example. The files transferred to/from remote computer 44 may be stored in internal memory 62, or preferably hard disk 66.

The data transfer requests are transferred to CNC machine controllers 10 through data link 46, which may be programmed in a conventional manner to route the request to a particular controller 10 as identified by address field 74. Alternatively, the I/O processor 18 of each controller 10 may be programmed to monitor requests made through data link 46 and respond only to those requests that contain its controller address. Each controller 10 is programmed using conventional methods to monitor data transfer requests and to respond to such requests through its I/O processor 18, which will access the appropriate file on hard disk 40, for example. An example format for a controller's response is shown in FIG. 5. Such response 78 may include, for example, a request accept/deny bit 80, a controller address field 82, a file identifier field 84, and if the request was a read request for data from the controller, strings of file data 86 that may be status information or a part program, for example. If the data transfer request 70 from the remote computer 44 was a write request to transfer a file to a controller 10, and the controller response 78 indicates a transfer acceptance, then the remote computer 44 will send a data transfer 88 in a format shown, for example, in FIG. 5. Such data transfer may include a controller address 90, file identifier 92, and strings of file data 94 (e.g. a part program). The specific data transfer protocol and data formats will depend on the particular CNC machine controllers, remote computer and data link utilized. However, programming techniques and methods for implementing data communication between computers are well known in the art.

The present invention provides users of computer numerical control (CNC) systems with a unique capability that has been previously unavailable. Building on the advances of a now commercially available CNC machine controller (i.e. the Thermwood 91000 SuperControl), the present invention takes advantage of its multi-processor, multi-tasking abilities to monitor and store status information about each controller in a multi-controller facility or operation and to retrieve such information at a central remote site. Therefore, an entire plant operation can be analyzed for performance, production and optimization.

What is claimed is:

1. A system for selectively transferring information between a central computer and a plurality of remotely located computer-numerical-computer (CNC) machine controllers, each having a multi-tasking capability comprising:

a central computer;

a plurality of CNC machine controllers;

each of said controllers including means for storing a file of information to be transferred to said central computer;

a transfer means connected to said central computer and to each of said controllers for transferring information therebetween;

said central computer including means for selectively addressing each of said controllers and means for requesting an information transfer between said central computer and one of said controllers;

wherein each of said CNC machine controllers includes means for gathering and storing status information;

wherein said means for storing includes a status file; and wherein said status file includes an old status file for storing status information for a predetermined expired time span and a new status file for storing status information for a predetermined current time span.

2. A system as in claim 1 wherein each said CNC machine controller further includes means for replacing status information stored in said old status file with status information stored in said new status file.

3. A system as in claim 1 further including means for storing said status information for a predetermining time span in a new status file.

4. A system as in claim 3 further including writing said status information stored in said new status file into an old status file after expiration of said predetermined time span, clearing said new status file, beginning a new time span and storing new status information in said new status file for a new time span.

5. A system for selectively transferring information between a central computer and a plurality of remotely located computer-numerical-control (CNC) machine controllers, comprising:

a central computer;

a plurality of CNC machine controllers;

each of said controllers having a multi-tasking capability and including means for storing a file of information to be transferred to said central computer;

a transfer means connected to said central computer and to each of said controllers for transferring information therebetween; and said central computer including means for selectively addressing each of said controllers and means for requesting an information transfer between said central computer and one of said controllers;

wherein means for storing includes a status file; and wherein said status file includes an old status file for storing status information for a predetermined expired time span and a new status file for storing status information for a predetermined current time span.

6. A system as in claim 5 wherein each of said CNC machine controllers includes means for gathering and storing status information.

7. A system as in claim 6 wherein said means for storing includes a status file.

8. A system as in claim 7 wherein said status file includes an old status file for storing status information for a predetermined expired time span and a new status file for storing status information for a predetermined current time span.

9. A system as in claim 8 wherein each said CNC machine controller further includes means for replacing status information stored in said old status file with status information stored in said new status file.

10. A system as in claim 7 wherein said information transferred between said CNC machine controllers and said central computer includes status information stored in said new status file.

11. A system as in claim 7 further including means for storing said status information for a predetermined time span in new status file.

12. A system as in claim 11 further including writing said status information stored in said new status file into an old status file after expiration of said predetermined time span, clearing said new status file, beginning a new time span and storing new status information in said new status file for new time span.

13. A system as in claim 5 wherein each of said CNC machine controllers includes means for storing a part program and said information transferred between said CNC machine controllers and said central computer includes a part program.

\* \* \* \* \*

UNITED STATES PATENT AND TRADEMARK OFFICE
CERTIFICATE OF CORRECTION

PATENT NO.     : 6,445,959 B1
DATED          : September 3, 2002
INVENTOR(S)    : Philip J. Poth It is certified that error appears in the above-identified patent and that said Letters Patent is hereby corrected as shown below:

<u>Column 2,</u>
Line 7, delete "9100A" and insert -- 91000 -- in lieu thereof.

<u>Column 6,</u>
Line 44, insert -- said -- between "in" and "new."

Signed and Sealed this

Eighth Day of April, 2003

JAMES E. ROGAN
*Director of the United States Patent and Trademark Office*